United States Patent Office 2,778,852
Patented Jan. 22, 1957

2,778,852
PRODUCTION OF CHLOROCARBOXYLIC ACID CHLORIDES

Karl Adam and Hans-Georg Trieschmann, Ludwigshafen (Rhine), Germany, assignors to Badische Anilin- & Soda-Fabrik Aktiengesellschaft, Ludwigshafen (Rhine), Germany No Drawing. Application July 10, 1953,
Serial No. 367,358

Claims priority, application Germany July 12, 1952

2 Claims. (Cl. 260—544)

This invention relates to an improved process for the production of carboxylic acid chlorides together with alkyl chlorides.

We have found that carboxylic acid chlorides together with alkyl chlorides are obtained by reacting phosgene on carboxylic acid alkyl esters at raised temperatures. If cyclic esters, i. e. lactones, are used as initial materials, chlorocarboxylic acid chlorides are obtained.

In the case of using esters as starting material, the process may be represented by the following general formula:

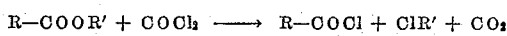

wherein R and R' represent equal or different alkyl, cycloalkyl or aralkyl groups, and R may also represent an aryl group.

In the case of using γ-butyrolactone as the starting material, the reaction is represented by the following formula:

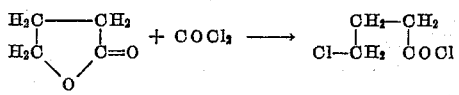

Suitable carboxylic acid alkyl esters are, for example, the methyl, ethyl, butyl, hexyl, cyclohexyl, benzyl or benzhydryl esters of acetic, propionic, stearic, benzoic or diphenylacetic acids. Suitable lactones are, for example, the γ-butyrolactone, the γ-and the δ-valerolactone.

The reaction preferably takes place by leading a current of phosgene into the heated carboxylic acid ester or lactone. The reaction can be considerably accelerated by the addition of small amounts of tertiary amines, such as pyridine or N.N-dialkylanilines, or of heavy metals, such as copper or iron, or of acid agents, such as sulfuric acid, phosphoric acid, phosphorus chlorides and phosphorus oxychloride, aluminum chloride, sulfuryl chloride or chlorosulfonic acid.

The most favorable reaction temperatures are somewhat different depending on the nature of the initial materials, but can readily be determined by preliminary experiments. Generally speaking, the process is carried out at about 80° to 180° C. When using esters of low boiling point, the reaction is carried out under such pressure that the ester remains liquid. Sometimes it is preferable to co-employ solvents which are inert to phosgene, as for example hydrocarbons or chlorinated hydrocarbons.

The reaction products are generally worked up most simply by fractional distillation. In many cases the alkyl chlorides or carboxylic acid chlorides formed, for example, distil off during the reaction; in this case they are preferably purified by another distillation.

The carboxylic acid chlorides and the alkyl chlorides, or the chlorocarboxylic acid chlorides obtainable according to this invention are valuable intermediates, for example, for dyestuffs, textile assistants and solvents. The process is important in so far as it permits the direct working up of esters or lactones without previous saponification.

The following examples will further illustrate this invention but the invention is not restricted to these examples. The parts are parts by weight.

Example 1

178 parts of the normal butyl ester of benzoic acid to which about 2 parts of pyridine and 0.5 part of phosphorus trichloride have been added are charged into a cylindrical reaction vessel, capable of being heated, which is closed at the bottom by a sieve plate and is provided at the top with a condenser leading to a receiver. A current of about 30 parts of phosgene gas per hour is passed through the sieve plate at about 140° C. The normal butyl chloride formed distils over. After about 6 hours, the whole of the ester has been used up. 124 parts of benzoyl chloride and 81 parts of normal butyl chloride are obtained by fractional distillation of the contents of the vessel and of the receiver, respectively.

In the same way, for example, acetic acid benzhydryl ester is converted into acetyl chloride and diphenyl chloromethane, the acetyl chloride distilling over during the reaction and the alkyl chloride (diphenyl chloromethane) remaining in the vessel.

Example 2

192 parts of γ-butyrolactone, after the addition of 2 parts of pyridine, are reacted with phosgene at 120° C. during the course of 8 hours in the way described in Example 1. By distilling the contents of the vessel there are obtained 296 parts of γ-chlorobutyric acid chloride as a colorless oil having a pungent odor and a boiling point of 67° C. at 15 torr.

What we claim is:

1. An improved process for the production of chlorocarboxylic acid chlorides which comprises reacting phosgene at about 80° to 180° C. on a lactone selected from the group consisting of gamma-butyrolactone, gamma-valerolactone and delta-valerolactone.

2. An improved process for the production of γ-chlorobutyric acid chloride which comprises reacting phosgene at about 120° C. on γ-butyrolactone in the presence of about 1 percent of pyridine.

References Cited in the file of this patent

UNITED STATES PATENTS

| | | |
|---|---|---|
| 1,792,163 | Henle | Feb. 10, 1931 |
| 2,013,989 | Meder et al. | Sept. 10, 1935 |
| 2,657,233 | Carnahan | Oct. 27, 1953 |

FOREIGN PATENTS

| | | |
|---|---|---|
| 172,339 | Austria | Aug. 25, 1952 |

OTHER REFERENCES

Groggins, Unit Processes in Organic Synthesis, 4th ed. 1952, pg. 224.